United States Patent
Johnson et al.

(10) Patent No.: US 9,854,186 B2
(45) Date of Patent: Dec. 26, 2017

(54) METHODS AND APPARATUS FOR AN IMAGES SENSOR WITH ROW-LEVEL GAIN CONTROL

(71) Applicant: SEMICONDUCTOR COMPONENTS INDUSTRIES, LLC, Phoenix, AZ (US)

(72) Inventors: Richard Scott Johnson, Boise, ID (US); Orit Skorka, San Jose, CA (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

(21) Appl. No.: 15/161,519

(22) Filed: May 23, 2016

(65) Prior Publication Data

US 2017/0230593 A1 Aug. 10, 2017

Related U.S. Application Data

(60) Provisional application No. 62/291,579, filed on Feb. 5, 2016.

(51) Int. Cl.
*H04N 5/355* (2011.01)
*H04N 5/374* (2011.01)

(52) U.S. Cl.
CPC ........... *H04N 5/3559* (2013.01); *H04N 5/374* (2013.01)

(58) Field of Classification Search
CPC .................. H04N 5/3559; H04N 5/374
See application file for complete search history.

(56) References Cited

U.S. PATENT DOCUMENTS

| 8,606,008 | B2* | 12/2013 | Monobe | G06T 5/009 |
| | | | | 358/463 |
| 8,675,103 | B2* | 3/2014 | Cieslinski | H04N 5/343 |
| | | | | 348/229.1 |
| 8,730,330 | B2* | 5/2014 | Solhusvik | H04N 5/335 |
| | | | | 348/187 |
| 2009/0167915 | A1* | 7/2009 | Hirota | H04N 5/357 |
| | | | | 348/302 |
| 2015/0054973 | A1 | 2/2015 | Velichko | |

* cited by examiner

*Primary Examiner* — Padma Haliyur
(74) *Attorney, Agent, or Firm* — The Noblitt Group, PLLC

(57) ABSTRACT

Various embodiments of the present technology may comprise methods and systems image sensors. The methods and systems may comprise selectively activating either high or low conversion gain mode for a predetermined number of rows by comparing pixel row data to predetermined threshold values prior to image signal processing.

20 Claims, 14 Drawing Sheets

METHODS AND APPARATUS FOR AN IMAGES SENSOR WITH ROW-LEVEL GAIN CONTROL

CROSS-REFERENCE TO RELATED APPLICATION(S)

This application claims priority to U.S. Provisional Application No. 62/291,579, filed on Feb. 5, 2016, entitled "Methods and Apparatus for Image Sensors," invented by Richard Scott Johnson and Orit Skorka, and is incorporated herein by reference and priority thereto for common subject matter is hereby claimed.

BACKGROUND OF THE TECHNOLOGY

Electronic devices, such as cellular telephones, cameras, and computers, commonly use image sensors to capture images. A typical CMOS imager circuit includes a focal plane array of pixels, and each pixel includes a photosensor, such as a photogate, photoconductor, or photodiode, for accumulating photo-generated charge in a portion of the substrate. Each pixel has a charge storage region, formed on or in the substrate. The charge storage region may be constructed as a floating diffusion region. In some imager circuits, each pixel may include at least one electronic device, such as a transistor, for transferring charge from the photosensor to the storage region, a second device, also typically a transistor, for resetting the storage region to a predetermined charge level prior to charge transference, and a third device for amplification of the signal to a readout line.

In a CMOS imager with integrating pixels or pixels that operate in integrating mode, the active elements of a pixel perform the necessary functions of: (1) photon to charge conversion; (2) accumulation of image charge; (3) resetting the storage region to a known state; (4) transfer of charge to the storage region accompanied by charge amplification; (5) selection of a pixel for readout; and (6) output and amplification of a signal representing a reset level and pixel charge. Photo charge may be amplified when it moves from the initial charge accumulation region to the storage region. The charge at the storage region is typically converted to a pixel output voltage by a source follower output transistor.

An important performance characteristic of any imager is its dynamic range. A high dynamic range is desirable in applications for sensing low light signals and capturing images with large variations in luminance or brightness. In particular, the dynamic range of an imager can be defined as the ratio of the minimum luminance the imager detects under saturation to the luminance the imager detects at a signal-to-noise ratio (SNR) equal to one. Examples of high dynamic range scenes include an indoor room with outdoor window, outdoor mixed shadow and bright sunshine, night time scenes combining artificial lighting and shadows, and in an automotive context, an automobile entering or about to leave a tunnel or shadowed area on a bright day.

Intrascene dynamic range refers to the range of incident signals that can be accommodated by an imager in a single frame of image data. In conventional dual conversion gain sensors, a fixed conversion gain is applied to the entire image frame. However, scenes to be imaged often include both brighter and darker portions across any given row of image pixels. Performing image capture operations using conventional image sensors and image processing techniques that control image pixels in an entire frame to operate in the high gain or low gain mode may cause some image pixels to generate excessively noisy, under-exposed, or saturated image signals.

In other imaging systems, the same scene may be captured twice: once in low gain mode and once in high gain mode. Both images can then be used to reconstruct one high dynamic range image. This approach reduces the frame rate by a factor of two and may also include image artifacts due to the time difference between each image capture.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various electrical components, programmable logic devices, and the like, which may carry out a variety of functions. In addition, the present technology may be practiced in conjunction with any number of systems where high dynamic range is desired, such as automotive systems, inspection systems, surveillance systems, and the like, and the system described is merely one exemplary application for the technology. Further, the present technology may employ any number of conventional techniques for transmitting, processing, and outputting signals.

Methods and systems for image sensors according to various aspects of the present invention may provide improved dynamic range, for example in conjunction with dual conversion gain circuits. The methods and systems for image sensors according to various aspects of the present technology may operate in conjunction with any suitable electrical system and/or camera application. Various representative implementations of the present technology may be applied to any appropriate machine vision application.

Figure 1:
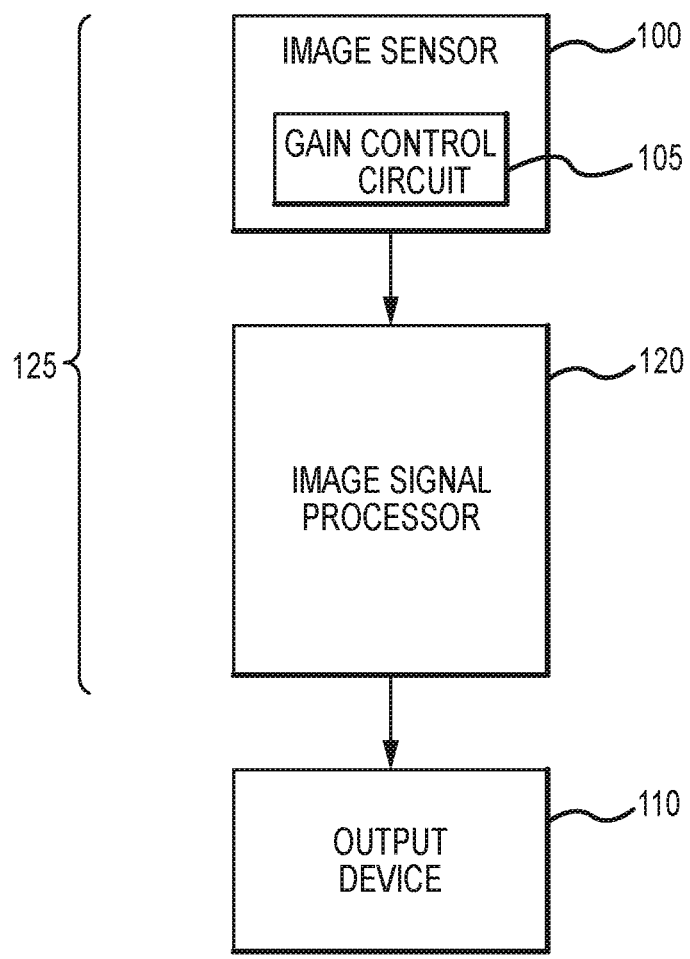
FIG. 1 representatively illustrates an imaging system in accordance with an exemplary embodiment of the present technology.

Referring now to FIG. 1, in an exemplary embodiment of the present technology, a method and system for image sensors with high dynamic range operate in conjunction with an image sensor 100, an image signal processor 120, and an output device 110. In this exemplary embodiment, the image sensor 100 may comprise a gain control circuit 105 implemented on-chip and control pixel gain.

The image signal processor 120 may comprise one or more integrated circuits, such as image processing circuits, microprocessors, and storage devices, such as random-access memory, non-volatile memory or any other memory device suitable for the particular application. In various embodiments, the image signal processor 120 may process and store the digital pixel data. For example, the image signal processor 120 may perform image reconstruction, such as demosaicing, white balancing, noise reduction, color correction, and the like.

The image sensor 100 and the image signal processor 120, collectively referred to as an imaging device 125, may capture and convey image data, and may be used within an electronic device, such as a camera, a cellular telephone, a tablet computer, a webcamera, a video camera, a video surveillance system, an automotive imaging system, a video gaming system with imaging capabilities, or any other desired imaging system. In various embodiments, the electronic device may capture image data by converting incoming light into a digital image, as described below.

The output device 110 may comprise an external device, such as a computer display, memory card, or some other external unit. In one embodiment, the output device 110 is part of a system for machine vision. The output device 110 may receive digital image data, such as video data, image data, frame data, and/or gain information from the image signal processor 120. For example, the electronic device may comprise the output device 110, such as a display screen or a memory component, for viewing and/or storing the digital image data.

Figure 2:
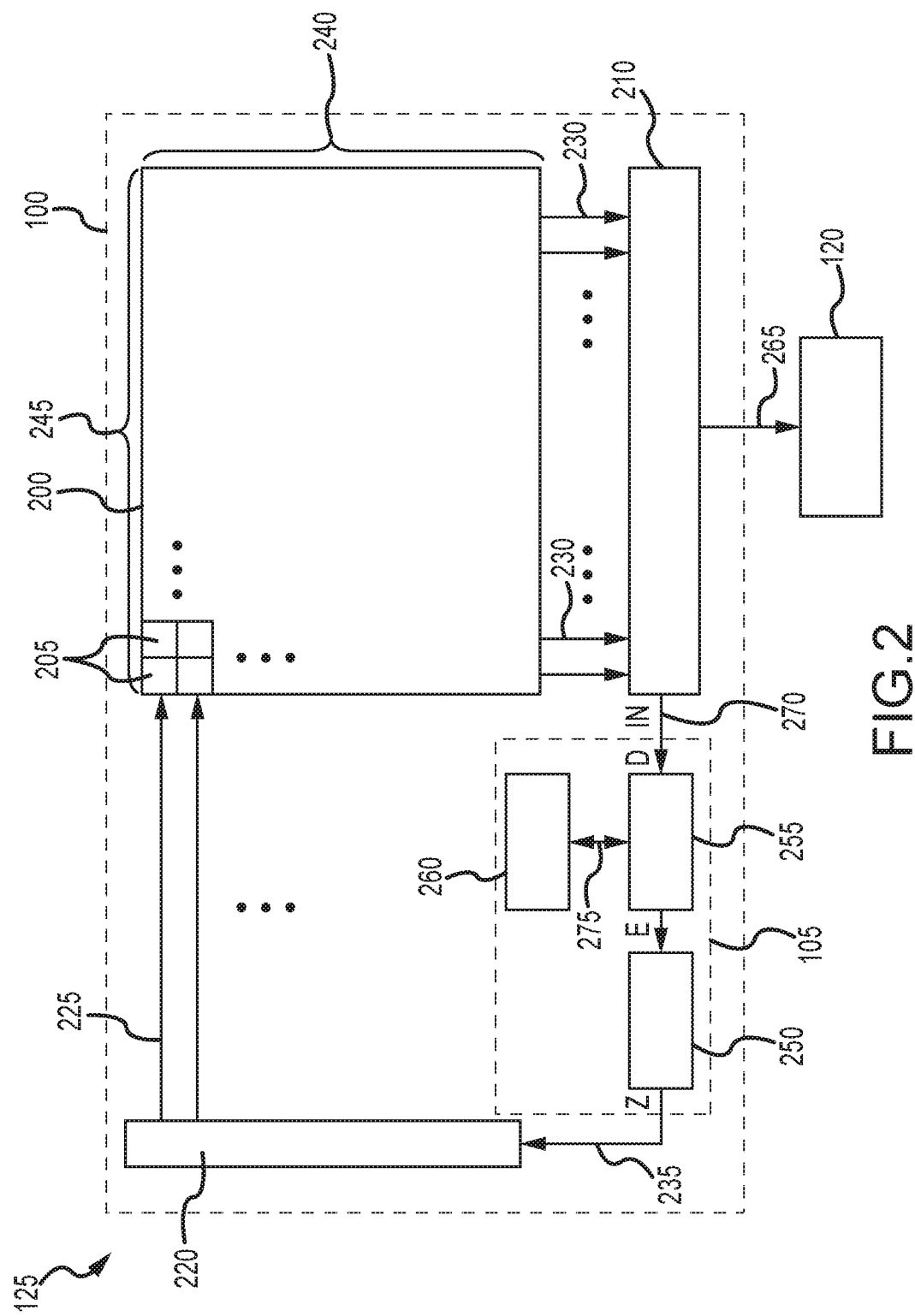
FIG. 2 representatively illustrates an imaging device in accordance with an exemplary embodiment of the present technology.

Referring now to FIG. 2, in an exemplary embodiment of the imaging device 125, the image sensor 100 may comprise row circuitry 220, column circuitry 210, and a pixel array 200. The pixel array 200 may comprise individual pixels 205 arranged in rows 240 and columns 245, and the pixel array 200 may contain any number of rows 240 and columns 245, for example, hundreds or thousands of rows 240 and columns 245.

The row circuitry 220 may receive row addresses from the control circuitry 105 and supply corresponding row control signals, such as reset, row select, charge transfer, and readout control signals to the pixels 205 over row control paths 225 to the pixels 205 in the pixel array 200.

The column circuitry 210 may comprise column control circuitry, readout circuitry, processing circuitry, and column decoder circuitry, and may receive image signals, such as analog pixel signals generated by the pixels 205. Column paths 230 may be configured to couple each column of the pixel array 200 to the column circuitry 210. The column paths 230 may be used for reading out image signals from the pixel 205 and/or supplying bias signal (e.g. bias current or bias voltages).

The column circuitry 210 may further comprise an amplifier circuit (not shown) configured to amplify an output signal, such as the pixel 205 output. The amplifier circuit may be interposed on the column paths 230 such that each column of the pixel array 200 may have a corresponding amplifier circuit. The amplifier circuit may amplify the image signal received from an associated column in the pixel array 200, and may provide the received image signal with a desired gain (e.g. an adjustable gain). In various embodiments, the amplifier circuit may provide the image signals received from the pixels 205 with a relatively high gain, such as when the corresponding pixel captures darker portions of a scene, or may provide image signals with a relatively low gain, such as when the corresponding pixel captures brighter portions of a scene. The column circuitry 210 may provide control signals to the amplifier circuit to control the gain of the image signals provided by the pixels 205.

The column circuitry 210 may further comprise a sample-and-hold circuit for sampling and temporarily storing image signals read out from the pixel array 200, an amplifier circuit, an analog-to-digital conversion (ADC) circuit, a bias circuit, a comparator circuit, column memory, a latch circuit for selectively enabling or disabling the column circuitry, and/or other circuits that are coupled to one or more columns of the pixel array 200. The ADC circuit converts analog pixel signals received from the pixel array 200 into corresponding digital pixel signals (also referred to as digital pixel output or digital pixel data). The digital pixel signals may be transmitted along a first conduction line 265 to the image signal processor 120 and/or along a second conduction line 270 to the gain control circuit 105.

The gain control circuit 105 may be configured to receive a first input IN, for example the digital pixel signals for one or more rows 240 of the pixel array 200 from the column circuitry 210 via the second conduction line 270. In an exemplary embodiment, the gain control circuit 105 may comprise a logic circuit 250, a statistics circuit 255, and a storage device 260. The gain control circuit 105 may transmit an output signal Z to the row circuitry 220 via a third conduction line 235.

The statistics circuit 255 may comprise an input D and an output E. In an exemplary embodiment, the input D corresponds to the input IN of the gain control circuit 105. The statistics circuit may also be coupled to the storage device 260 via a communication bus 275 and configured to transmit and receive communication signals to and from the storage device 260. In an exemplary embodiment, the statistics circuit 255 may comprise any circuit suitable for performing a set of calculations, such as to calculate a mean, median, or moving average of a set of predetermined values. For example, the statistics circuit 255 may comprise any number of wires, adder circuits, shift operations, clocking mechanisms, and the like. The statistics circuit 255 may also utilize memory cells within the storage device 260 for storing bits of pixel data during the calculation. The statistics circuit 255 may be implemented using transistors or any other semiconductor devices suitable for a particular application.

The storage device 260 may comprise any suitable type of semiconductor memory, such as volatile or non-volatile memory. The storage device 260 may comprise one or more memory cells, such as dynamic random access memory cells (DRAM), static random access memory cells (SRAM), or bistable flip-flops. The storage device may be implemented using transistors or other semiconductor devices and may be configured to store a number N, where N represents a number of rows 240.

In one embodiment, the gain control circuit 105 may be implemented with a programmable logic device, such as a field programmable gate array (FPGA) or any other device with reconfigurable digital circuits. In alternative embodiments, the gain control circuit 105 may be formed in the chip that includes the pixel array 200. In an exemplary embodiment, the gain control circuit 105 may receive pixel signals directly from the column circuitry 220.

Figure 4:
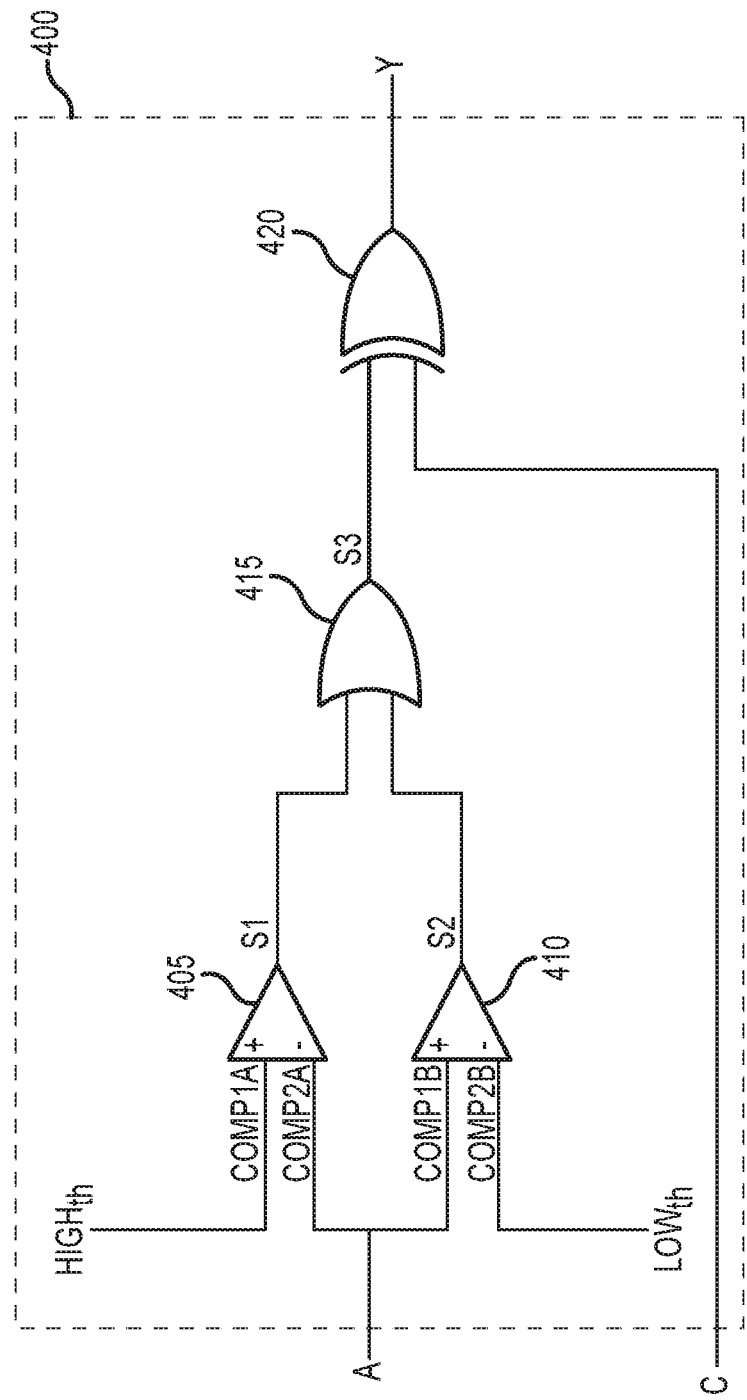
FIG. 4 representatively illustrates a logic diagram in accordance with an exemplary embodiment of the present technology.

Referring now to FIG. 4, the logic circuit 250 (FIG. 2) may comprise one or more electrical components, such as a logic gate, a transistor, a clocking mechanism, and the like. In one embodiment, the logic circuit 250 may be implemented in the programmable logic device and comprise one or more logic blocks 400. The logic block 400 may comprise a first comparator 405, a second comparator 410, an OR gate 415, and an XOR gate 420. In one embodiment, the logic block 400 may receive an input signals A and C and generate an output signal Y.

The first comparator 405 may receive first and second input signals COMP1A, COMP2A, and generate an output signal S1. Likewise, the second comparator 410 may receive first and second input signals COMP1B, COMP2B, and generate an output signal S2. In exemplary embodiments, one of the inputs of the first comparator 405, for example the first input COMP1A, comprises a high threshold value $HIGH_{th}$, and one of the inputs of the second comparator 410, for example, the second input COMP2B, comprises a low threshold value $LOW_{th}$. The high and low threshold values may be predetermined values based on the bit resolution of the analog-to-digital converter (ADC). For example, for a 12-bit resolution ADC, the bit values range from zero to 4095, so the high and low threshold values will be selected from this range. In exemplary embodiments, the high and low threshold values may be selected based on providing a desired image output.

Figure 6:
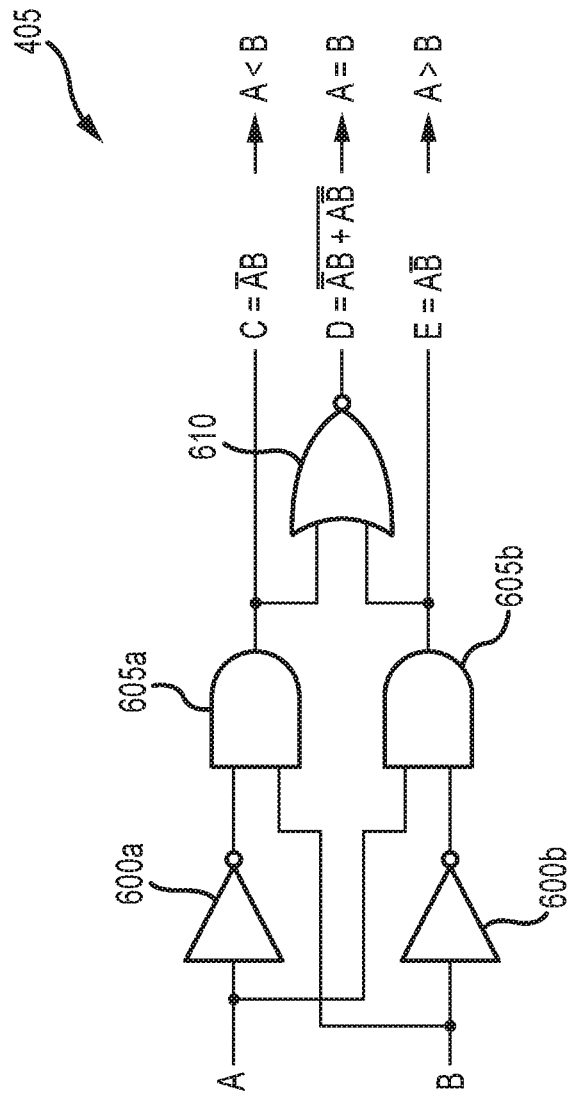
FIG. 6 representatively illustrates a comparator circuit in accordance with an exemplary embodiment of the present technology.
Figure 7:
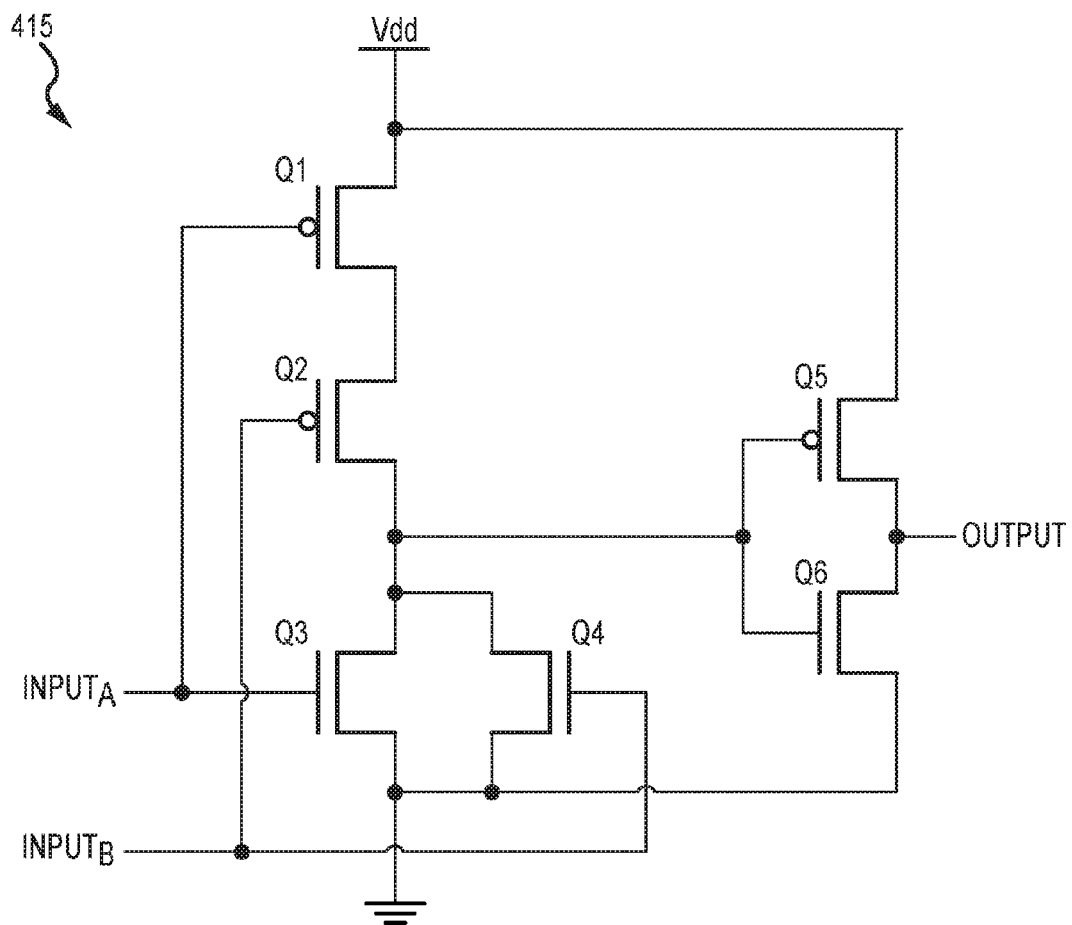
FIG. 7 representatively illustrates a CMOS circuit diagram of an OR gate in accordance with an exemplary embodiment of the present technology.
Figure 8:
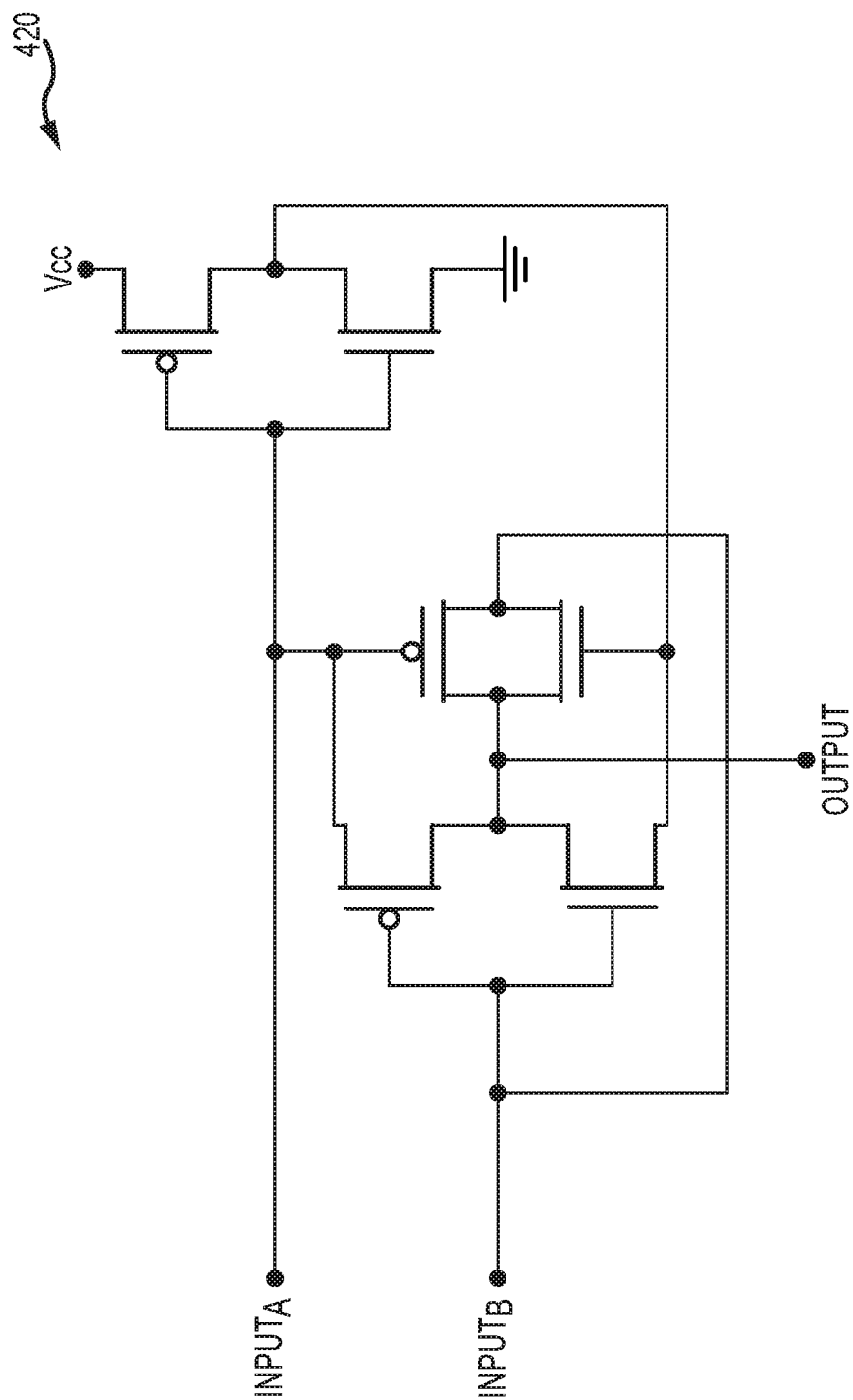
FIG. 8 representatively illustrates a CMOS circuit diagram of an XOR gate in accordance with an exemplary embodiment of the present technology.
Figure 9:
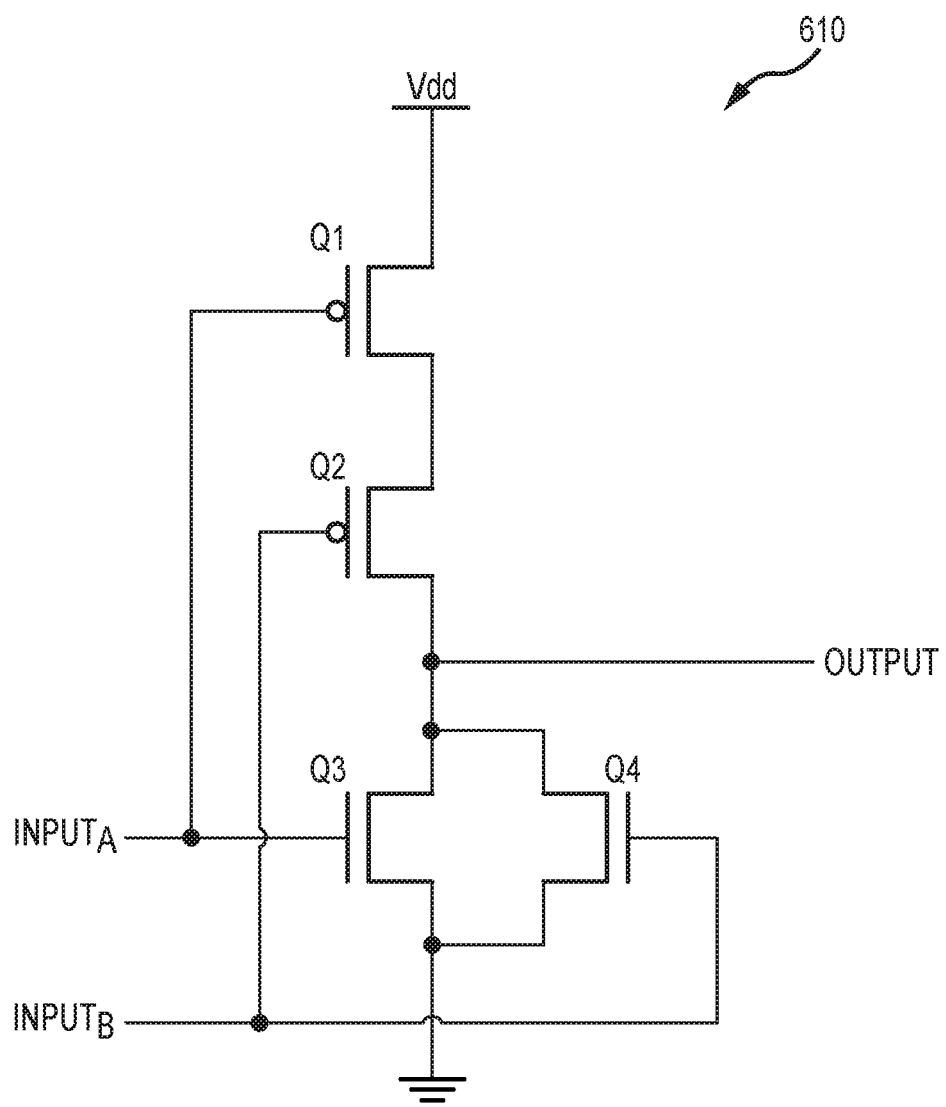
FIG. 9 representatively illustrates a CMOS circuit diagram of a NOR gate in accordance with an exemplary embodiment of the present technology.
Figure 10:
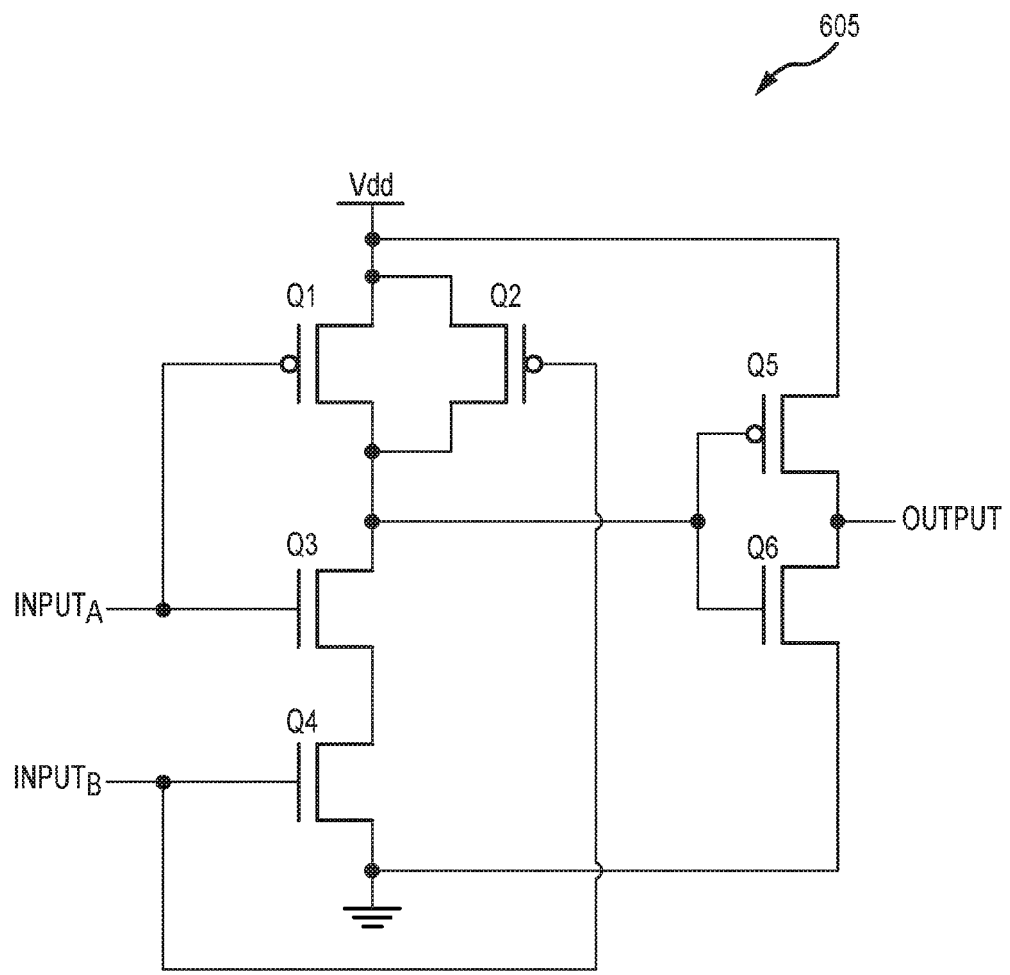
FIG. 10 representatively illustrates a CMOS circuit diagram of an AND gate in accordance with an exemplary embodiment of the present technology.
Figure 11:
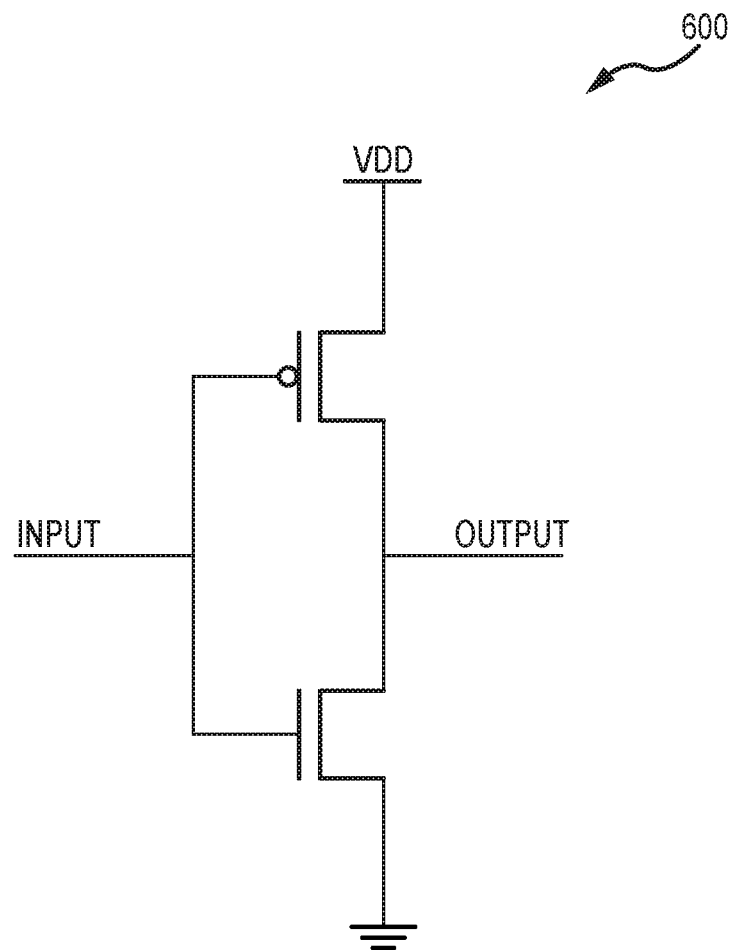
FIG. 11 representatively illustrates a CMOS circuit diagram of an inverter in accordance with an exemplary embodiment of the present technology.

In various embodiments, the first and second comparators 405, 410 may be implemented with one or more logic gates as illustrated in FIG. 6. For example, the first and second comparators 405, 410 may comprise an inverter 600, an AND gate 605, and a NOR gate 610. While FIG. 6 illustrates a 1-bit digital comparator circuit, a comparator may have digital inputs with any number of bits.

The OR gate 415 may receive first and second input signals corresponding to the output signals S1, S2 of the first and second comparators 405, 410, respectively, and generate an output signal S3. The XOR gate 420 may receive first and second input signals, where one input corresponds to the output signal S3 of the OR gate 415 and the other input receives the input signal, C, representing a current gain mode (i.e. high or low gain). The XOR gate 420 may generate the output Y of the logic block 400.

Referring now to FIGS. 7 through 11, in various embodiments, the logic block 400 may also be implemented in silicon using semiconductor devices, such as transistors, clocking devices, and the like. FIGS. 7 through 11 illustrate a CMOS (complementary metal-oxide semiconductor) circuit diagram to perform the function of each of the inverter 600, the AND gate 605, the NOR gate 610, the OR gate 415, and the XOR gate 420. In various embodiments, each of the logic gates may be implemented using PMOS (p-channel metal-oxide semiconductor) and NMOS (n-channel metal-oxide semiconductor) transistors and electrically connected in the same manner as described in FIG. 4.

Figure 3:
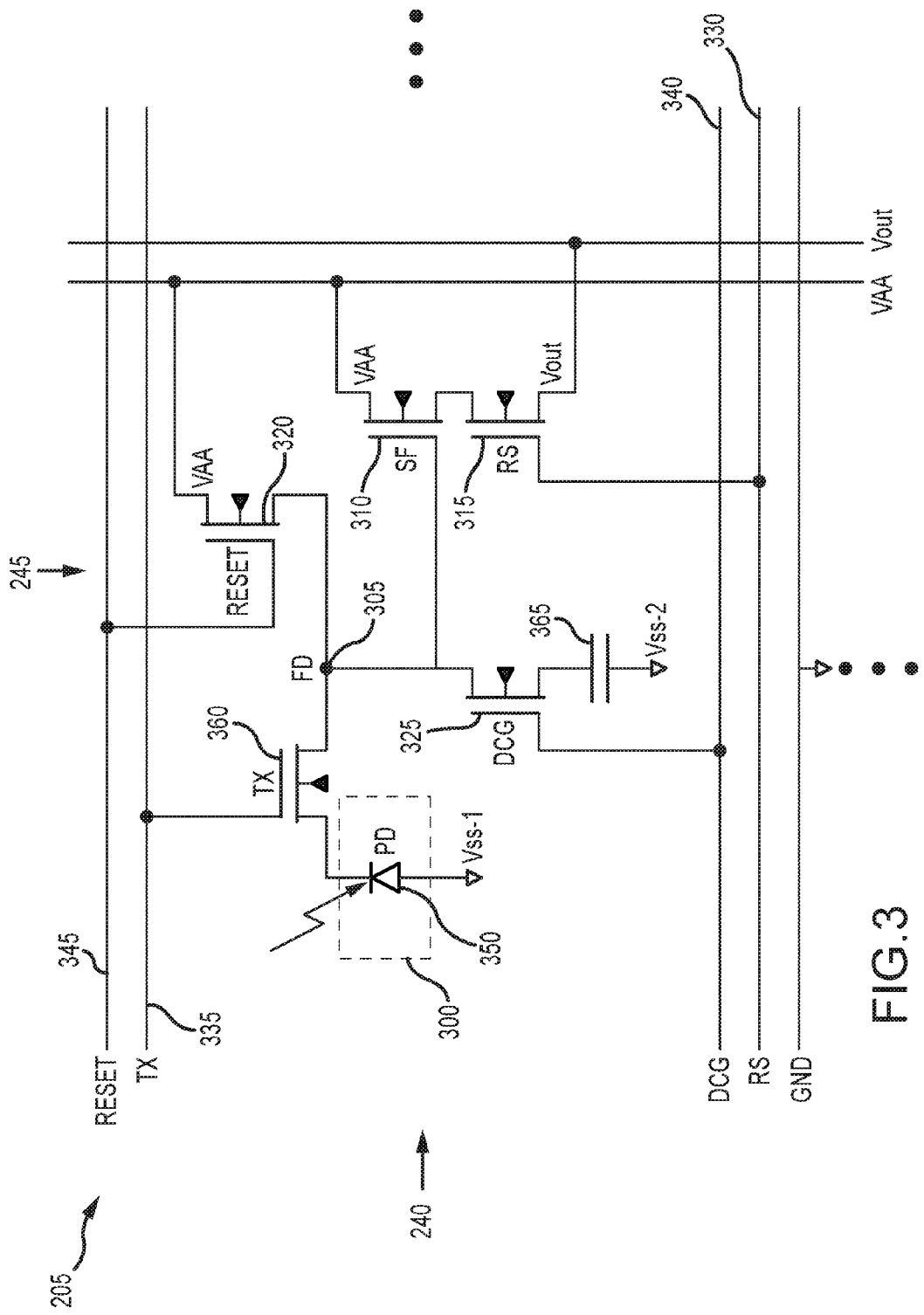
FIG. 3 representatively illustrates a pixel circuit in accordance with an exemplary embodiment of the present technology.

Referring now to FIG. 3, the pixel 205 within the pixel array 200, according to an exemplary embodiment, may comprise a photosensitive region 300, a charge storage node 305, a source follower transistor 310, a row select transistor 315, a reset transistor 320, a charge transfer gate 360, and a dual conversion gain transistor 325.

The rows 240 and columns 245 of pixels 205 may be electrically connected via a row select line 330, a charge transfer line 335, a dual conversion gain control line 340, and a reset line 345. The row select line 330, the charge transfer line 335, the dual conversion gain control line 340, and the reset line 345 may receive control signals from the row control paths 225 (FIG. 2). The control signals may comprise a reset signal RESET, a charge transfer signal TX, a dual conversion gain signal DCG, and a row select signal RS. The pixel 205 may also be electrically connected to a voltage supply VAA and a ground supply Vss, or other reference potential. An image sensor 100 comprising the pixel 205 with the dual conversion gain transistor 325 may be referred to as a dual conversion gain image sensor.

The pixel 205 may include any number of photosensitive regions 300 for capturing image charge. In an exemplary embodiment, the photosensitive region 300 may comprise a photodiode 350. The photodiode 350 may be coupled to the charge storage node 305. In various embodiments, the photodiode 350 may be provided with a corresponding color filter element (not shown) for capturing light of a desired color. The color filter elements may be red, green, or blue, and may be arranged in any pattern on the pixel array 200 suitable for a particular application.

The charge storage node 305 (also referred to as a floating diffusion region) may be coupled to the photodiode 350. The charge storage node 305 may comprise a region of doped semiconductor, where doping may be by ion implantation, diffusion, or any other suitable doping techniques. The doped semiconductor region may exhibit a capacitance that can be used to store the charge that was collected by the photodiode 350.

The charge transfer gate 360 may be coupled between the photodiode 350 and the charge storage node 305. A gate terminal of the charge transfer gate 360 may be coupled to the charge transfer line 335 to receive a control signal, for example the charge transfer signal TX, to lower the potential barrier between the photodiode 350 and the charge storage node 305 to allow transfer of charge from the photodiode 350 to the charge storage node 305.

The reset transistor 320 may be coupled between the reset line 345 and the charge storage node 305, such that a gate terminal of the reset transistor 320 is coupled to the reset line 345, a drain terminal is connected to the power supply VAA, and a source terminal is connected to the charge storage region. The reset line 345 may apply a signal, such as the reset signal RESET to the gate terminal of the reset transistor 320.

The source follower transistor 310 may be coupled in series with the row select transistor 315. A gate terminal of the source follower transistor 310 may be coupled to the charge storage node 305, while a source terminal is connected to a drain terminal of the row select transistor 315. A drain terminal of the source follower transistor 310 may be coupled to the power supply VAA, and a source terminal of the row select transistor 315 may be connected to a readout line Vout.

The dual conversion gain transistor 325 may be coupled to the dual conversion gain control line 340 via a gate terminal, while a source terminal may be coupled to a capacitor 365, and a drain terminal may be coupled to the charge storage node 305. The dual conversion control line 340 may apply a control signal, for example the dual conversion gain signal DCG, to the gate terminal of the dual conversion gain transistor 325.

The capacitor 365 may comprise two parallel plates where one plate is connected to the source terminal of the dual conversion gain transistor 325 while the other plate is connected to the ground supply Vss or other potential. The capacitor 365 may provide the charge storage node 305 with additional charge storage when the dual conversion gain transistor is turned on. In other embodiments, the capacitor 365 may be replaced with any suitable electrical component and/or circuit capable of providing additional charge storage to the charge storage node 305.

Figure 5:
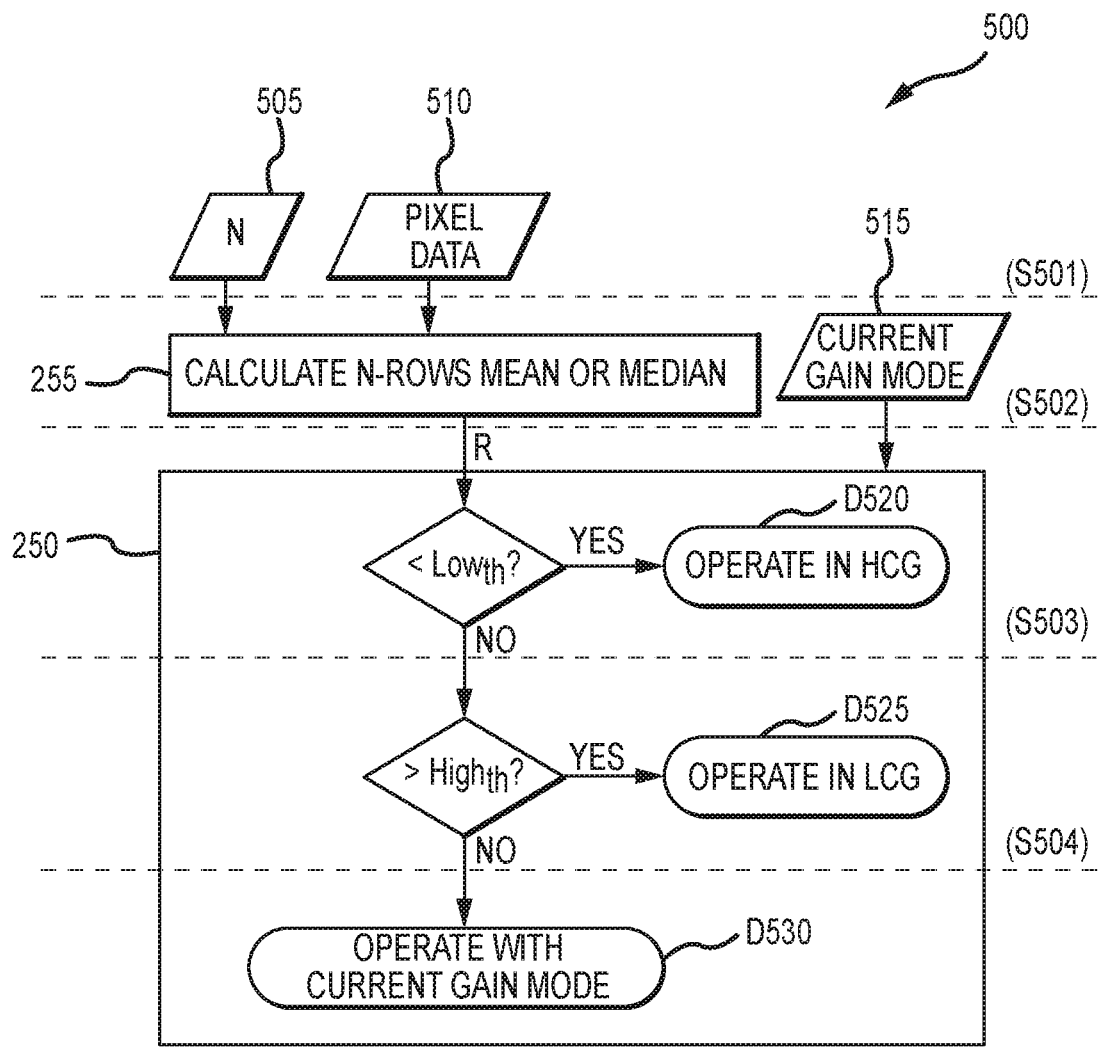
FIG. 5 representatively illustrates a logic block diagram in accordance with an exemplary embodiment of the present technology.

Referring now to FIG. 5, the gain control circuit 105 (FIG. 1) may perform a process 500, including selecting a gain mode based on pixel data 510 and the current operating gain mode 515.

The statistics circuit 255 may receive a number N representing a number of rows 505, and pixel data 510 from a current row (S501). The number of rows N may be stored in the storage device 260 (FIG. 2) and transmitted to the statistics circuit 255. The pixel data 510 may comprise a digital value, for example a 12-bit value. The process 500 may comprise performing a predetermined calculation. In an exemplary embodiment, the statistics circuit 255 may derive a first statistical value R from the pixel data for a particular number of rows. For example a mean (i.e. average or running average), a median, or a quartile value of the pixel data for a particular number of rows may be calculated and transmitted to the logic circuit 250. In other embodiments, more than one statistical value may be calculated and may, for example, comprise a second and a third statistical value.

In various embodiments, the process 500 may comprise utilizing the logic circuit 250 to execute one or more decisions. The logic circuit 250 may receive the first statistical value R from the statistics circuit 255 and the information regarding the current gain mode 515 (S502). In an exemplary embodiment, the logic circuit 250 may determine whether the first statistical value R is less than the low threshold LOWth (S503). If the first statistical value R is less than the low threshold LOWth, then the logic circuit 250 may apply a high conversion gain mode to the next N rows (D520). If the first statistical value R is greater than the high threshold HIGHth, then the next N rows will operate in low conversion gain mode (D525). If the first statistical value R is not greater than the high threshold HIGHth (in other words, if the first statistical value R is greater than the low threshold LOWth and less than the high threshold HIGHth), then the next N rows will operate in the current gain mode (D530) (i.e. the gain mode most recently in operation). The current gain mode 515 may be defined as a predetermined starting gain mode and/or the gain mode in operation during the immediately preceding read out process.

The process 500 and/or gain control circuit 105 may be implemented partially or entirely on-chip in silicon comprising PMOS and NMOS transistors, for example comprising the circuits illustrated in FIGS. 7-11, as described above, in an ASIC, using a processor and memory system, or other suitable implementation.

Referring to FIGS. 2 and 3, in operation, pixel data from the pixel 205 may be transmitted to the gain control circuit 105 via the column circuitry 210. The storage device 260 may be accessed by the statistics circuit 255 to transmit or retrieve a number N. The statistics circuit 255 may then receive N-row pixel data from the column circuitry 210, where the pixel data could be received from a single row or multiple rows. The N-row pixel data may be processed utilizing the statistic circuit 255. Once the first statistical value R is computed, it may be transmitted to the logic circuit 250 and compared to the high and low thresholds HIGHth, LOWth (FIG. 5). The output signal Z, signaling the instructions for the next N rows, may be transmitted from the logic circuit 250 to the row circuitry 220 via the third conduction line 235. The row circuitry 220 may then transmit a signal across the row control paths 225 to N rows in the pixel array 200 to enable or disable the dual conversion gain transistor 325.

The dual conversion gain transistor 325 may be enabled or disabled by applying a control signal, for example the dual conversion gain signal DCG, across the dual conversion gain control line 340. A high signal across the dual conversion gain control line 340 enables (i.e. the transistor is turned on) the dual conversion gain transistor 325, which means that the pixels 205 in that particular row 240 will operate in low conversion gain mode. Conversely, a low signal across the dual conversion gain control line 340 disables (i.e. the transistor is turned off) the dual conversion gain transistor 325, which means that the pixels 205 in that particular row 240 will operate in high conversion gain mode.

The pixel data for the N-rows is then transmitted through the readout lines to the column circuitry 210 and out to the image signal processor 120 for further image processing. Pixel data from the N-rows are processed by the gain control circuit 105 again to determine the operation mode (i.e. high conversion gain mode or low conversion gain mode) for the next N-rows. For example, if N=3, then the first 3 rows 240 (i.e. row 1, 2 and 3) of the pixel array 200 will be read out and transmitted to the gain control unit circuit 105, where the first statistical value R will be computed. The logic circuit 250 may then transmit a control signal, for example the dual conversion gain signal DCG, to the row circuitry 220 to operate rows 4, 5 and 6 in high or low conversion gain mode. The process of reading N-row pixel data, computing the first statistical value R of the N-row pixel data, and selecting an appropriate conversion gain may continue until all rows 240 of the pixel array 200 have been read. The number of rows N may be any predetermined number suitable for a particular application or image scene.

Referring back to FIG. 2, in an exemplary embodiment, pixel signals may not be processed by or transmitted to the image signal processor 120 prior to transmitting the output signal Z (i.e. the gain control signal) to the pixel array 240, but rather pixel signals may be transmitted to the gain control circuit 105, circumventing the image signal processor 120, such that the gain control circuit 105 utilizes the un-processed pixel data.

Figure 13:
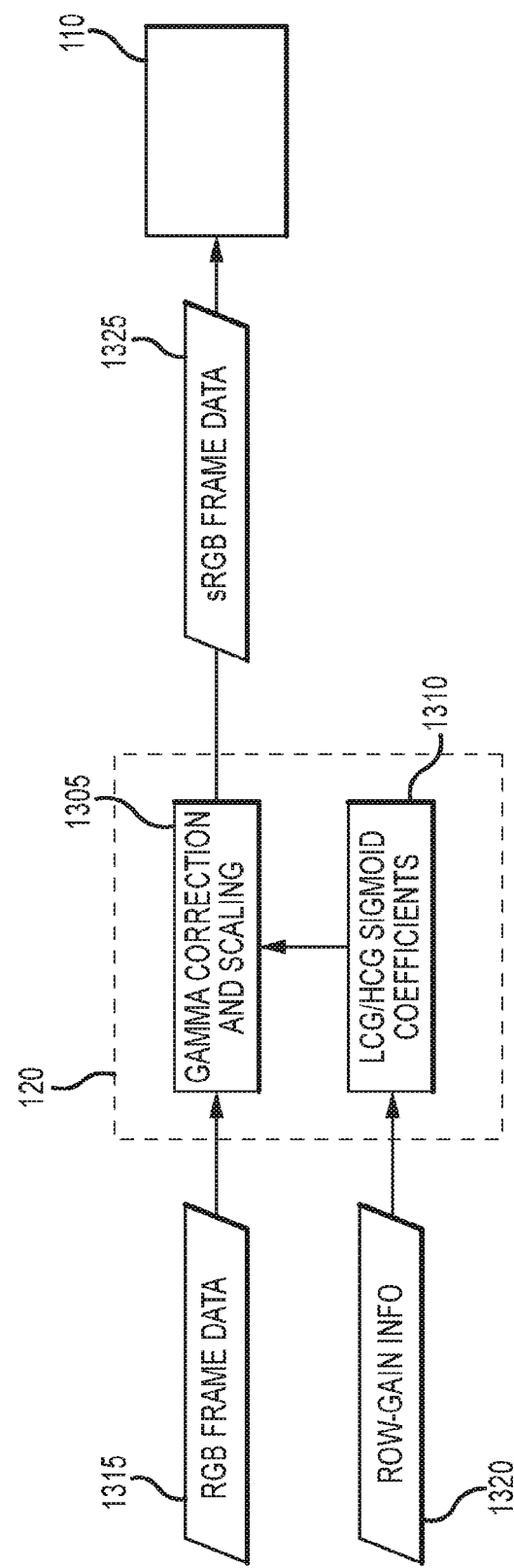
FIG. 13 representatively illustrates a gamma control unit in accordance with an exemplary embodiment of the present technology.
Figure 14:
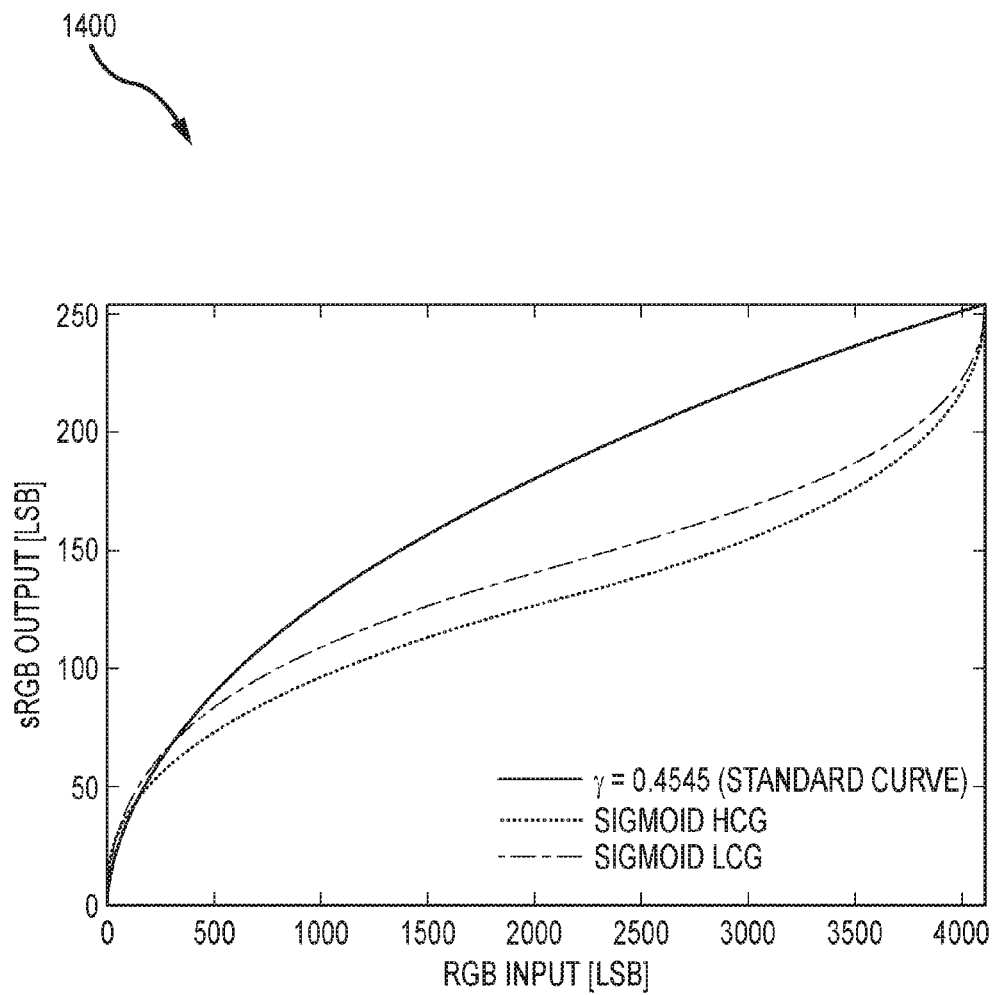
FIG. 14 representatively illustrates a gamma correction plot in accordance with an exemplary embodiment of the present technology.

Referring now to FIG. 13, in an exemplary embodiment, the image signal processor 120 may also be configured to perform color processing and tone mapping operations, such as demosaicing, white-balance, color correction, and gamma correction, and may comprise a gamma correction unit 1305. Tone mapping may be used to adjust shades and luminance captured by the pixels 205 (FIG. 3). Tone mapping using gamma encoding may facilitate presentation of a high dynamic range scene on a low dynamic range display. In the exemplary embodiment, the gamma correction unit 1305 may comprise an RGB frame data input 1315 and a row-gain information input 1320. Once all pixel data has been readout to the image signal processor 120, the gamma correction unit 1305 may utilize sigmoid coefficients 1310 to perform gamma correction and scaling 1305 to the image frame. Sigmoid curves may be used to display high dynamic range scene because they apply a higher gain to low input RGB values and lower gain to high input RGB values, however any suitable tone mapping technique may be used for a particular application. The coefficients 1310 that are used with the tone mapping operator are optimized to allow a smooth transition between rows that were captured with different conversion gains in the reconstructed frame. The plot 1400 in FIG. 14 presents RGB input values after color correction and their corresponding sRGB output values after gamma correction for three cases. The first case, "γ=0.4545," is the standard curve that may be sufficient for low dynamic range scenes. The other two cases, "Sigmoid HCG" and "Sigmoid LCG," are used with rows that were captured with high and low conversion gain mode, respectively.

Figure 12:
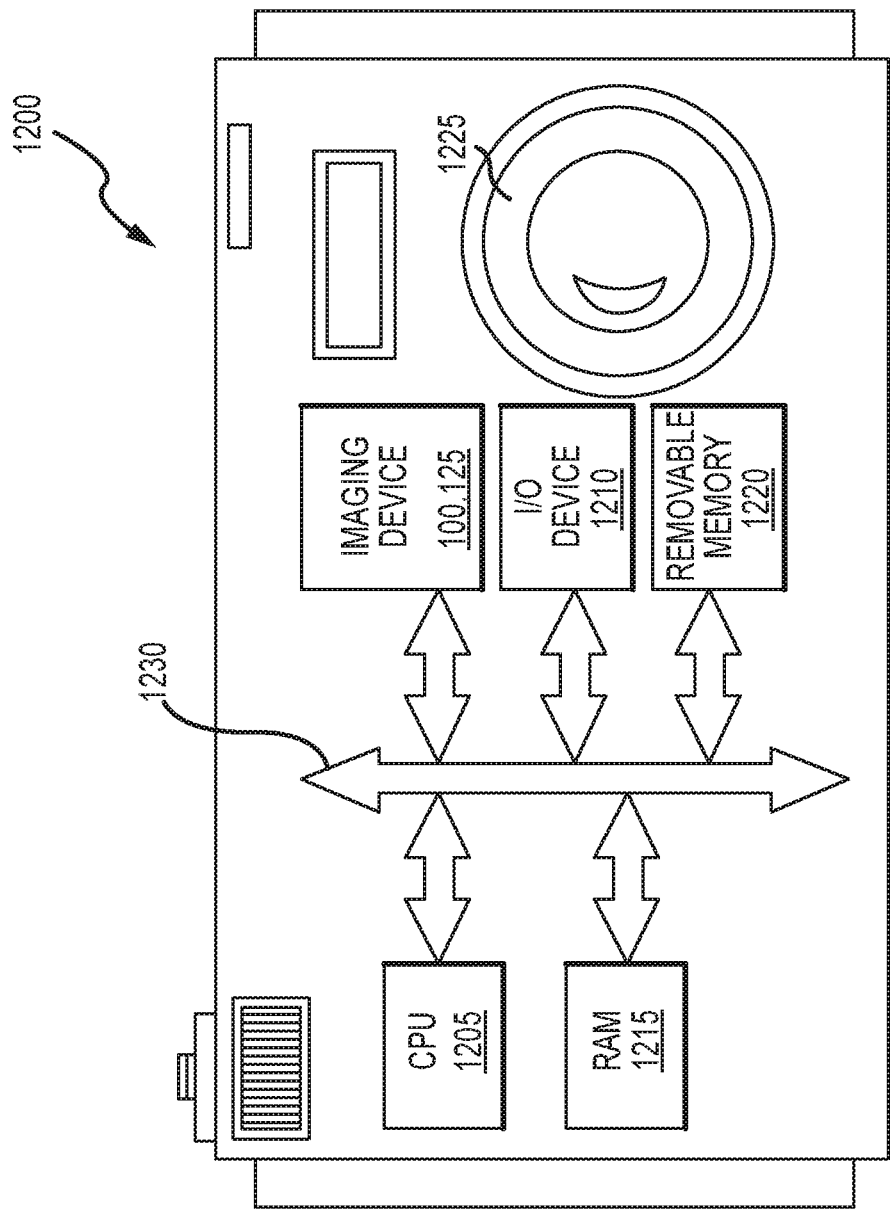
FIG. 12 representatively illustrates an imaging system in accordance with an exemplary embodiment of the present technology.

Referring now to FIG. 12, a system utilizing the imaging device 125 and the method 500 described above is illustrated in an electronic device, in this case a digital camera 1200. The imaging device 125 may also receive control or other data from the system as well, such as a shutter release. In various embodiments, the systems which may employ the imaging device include, without limitation, computer systems, camera systems, scanners, machine vision systems, vehicle navigation systems, video telephones, surveillance systems, auto focus systems, star tracker systems, motion detection systems, image stabilization systems, and others.

The system may include a central processing unit (CPU) 1205 that communicates with various devices over a bus 1230. Some of the devices connected to the bus 1230 may provide communication into and out of the system, for example an input/output (I/O) device 1210 and the imaging device 125. Other devices connected to the bus 1230 provide memory, for example, a random access memory (RAM) 1215, hard drive, and one or more peripheral memory devices 1220, such as a floppy disk drive and compact disk (CD) drive. While the bus 1230 is illustrated as a single bus, any number of busses may be used to provide communication paths to interconnect the devices.

The imaging device 125 may be combined with a processor, such as a CPU 1205, a digital signal processor, or a microprocessor, in a single integrated circuit, or may be on a separate chip. The imaging device 125 may be a CMOS imager constructed in accordance with any of the described embodiments and/or control methods.

In various embodiments, the electronic device may further comprise a lens 1225 configured to focus an image on the pixel array 200. For example, the lens 1225 may include a fixed and/or adjustable lens and may include microlenses formed on an imaging surface of the image sensor 100.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An image sensor comprising:
   an array of pixels, arranged in rows and columns, wherein each pixel is configured to:
      operate in a high conversion gain mode and a low conversion gain mode; and
      apply one of a high conversion gain and a low conversion gain to a plurality of pixel signals prior to signal readout;
   a column circuit coupled to the array and configured to receive the plurality of pixel signals from the array;

a gain control circuit coupled to the column circuitry and the array, and configured to: receive the pixel signals; and select the gain mode for a row of pixels according to the pixel signals received from at least one different row of pixels.

2. The image sensor of claim 1, wherein the gain control circuit further comprises a storage device storing pixel data.

3. The image sensor of claim 1, wherein the gain control circuit is further configured to set the gain mode for the row of pixels by comparing a statistical value derived from the pixel signals received from the at least one different row of pixels to a high threshold value and a low threshold value.

4. The image sensor of claim 1, wherein the gain control circuit is further configured to set the gain mode for the row of pixels by transmitting a first signal to the pixel array representing the high conversion gain mode and a second signal representing the low conversion gain mode.

5. The image sensor of claim 1, wherein the gain control circuit is further configured to transmit a control signal indicating the gain mode for the row of pixels via a control line to a transistor comprising:
a first terminal coupled to a charge storage region;
a second terminal coupled to a capacitor; and
a third terminal coupled to the control line.

6. The image sensor of claim 5, wherein the pixel operates in low conversion gain mode when the transistor is turned on, and the pixel operates in high conversion gain mode when the transistor is turned off.

7. The image sensor of claim 1, further comprising a row selector configured to selectively activate the row of pixels via a row select line, wherein the row select line is electrically connected to each pixel in a given row.

8. The image sensor of claim 1, further comprising an I/O device configured to communicate with an image signal processor.

9. The image sensor of claim 1, wherein the gain control circuit and the array of pixels are formed on the same silicon die.

10. An imaging system comprising:
an image sensor comprising:
an array of pixels, arranged in rows and columns, wherein each pixel:
operates in a high conversion gain mode and a low conversion gain mode; and
applies one of a high conversion gain and a low conversion gain to a plurality of pixel signals prior to signal readout;
column circuitry coupled to the array and configured to receive the plurality of pixel signals from the array;
a gain control circuit coupled to the column circuitry and the array, wherein the gain control circuit is configured to:
receive the pixel signals;
derive a statistical value from the pixel signals;
select a gain mode for a row of pixels based on the statistical value; and
provide a control signal to the array, wherein the row of pixels are configured to operate in the selected gain mode in response to the control signal; and an image signal processor coupled to the image sensor and configured to receive and process the pixel signal, and transmit a final output signal.

11. The imaging system of claim 10, wherein the gain control circuit further comprises a storage device configured as memory cells.

12. The imaging system of claim 10, wherein the gain control circuit is configured to select the gain mode for the row of pixels based on the statistical value by comparing the statistical value to a high threshold value and a low threshold value.

13. The imaging system of claim 10, wherein each pixel comprises a transistor comprising:
a first terminal coupled to a charge storage region;
a second terminal coupled to a capacitor; and
a third terminal coupled to the control signal.

14. The imaging system of claim 13, wherein each pixel operates in low conversion gain mode when the transistor is turned on, and operates in high conversion gain mode when the transistor is turned off.

15. The imaging system of claim 10, further comprising a row selector configured to selectively activate the row of pixels via a row select line, wherein the row select line is electrically connected to each pixel in a given row.

16. The imaging system of claim 10, wherein the image signal processor performs gamma correction on the row of pixels utilizing a curve coefficient.

17. The imaging system of claim 16, wherein the curve coefficient is selected based on the selected gain mode.

18. The imaging system of claim 16, wherein the gamma correction is based on a sigmoid curve.

19. The imaging system of claim 10, wherein at least a part of the image sensor and at least a part of the image signal processor are formed on the same silicon die.

20. A method for improving high dynamic range in an image sensor comprising:
arranging an array of dual conversion gain pixels in rows and columns, wherein each pixel is configured to operate in a high conversion gain mode and a low conversion gain mode;
selectively activating a row of pixels to produce pixel signals;
receiving, with a gain control circuit, the pixel signals from the activated row;
calculating a statistical value of the pixel signals from the activated row;
comparing the statistical value to a first threshold value and a second threshold value;
selecting a control signal wherein:
a first control signal is selected if the statistical value is less than or equal to the first threshold value; and
a second control signal is selected if the statistical value is greater than or equal to the second threshold value;
transmitting one of the first control signal and second control signal to a subsequent row of pixels;
operating the subsequent row of pixels in one of the high conversion gain mode or the low conversion gain mode according to the control signal; and
receiving and processing the pixel signals with an image signal processor.

* * * * *